(12) United States Patent
Patel et al.

(10) Patent No.: US 12,056,411 B2
(45) Date of Patent: Aug. 6, 2024

(54) METHOD AND PROCESSING UNIT FOR PROVIDING RECOMMENDATIONS IN A CONTENT RENDERING ENVIRONMENT

(71) Applicant: ZEALITY INC., Pleasanton, CA (US)

(72) Inventors: Dipak Mahendra Patel, Selvante St, CA (US); Avram Maxwell Horowitz, San Francisco, CA (US); Karla Celina Varela-Huezo, San Francisco, CA (US)

(73) Assignee: Zeality Inc, Pleasanton, CA (US)

( * ) Notice: Subject to any disclaimer, the term of this patent is extended or adjusted under 35 U.S.C. 154(b) by 45 days.

(21) Appl. No.: 17/723,493

(22) Filed: Apr. 19, 2022

(65) Prior Publication Data

US 2023/0333795 A1    Oct. 19, 2023

(51) Int. Cl.
*G06F 3/14* (2006.01)
*G06F 3/0484* (2022.01)

(52) U.S. Cl.
CPC .............. *G06F 3/14* (2013.01); *G06F 3/0484* (2013.01)

(58) Field of Classification Search
CPC .. G06F 3/14–153; G06F 3/048; G06F 3/0484; G06F 9/542; G09B 19/04; H04L 12/18–1895; H04L 65/403–4053; H04L 65/4015; H04N 7/15–157; G06Q 10/10; H04H 60/33
See application file for complete search history.

(56) References Cited

U.S. PATENT DOCUMENTS

| | | | |
|---|---|---|---|
| 8,187,005 B1 | 5/2012 | Ward | |
| 10,115,038 B2 | 10/2018 | Hazur et al. | |
| 11,562,657 B1 * | 1/2023 | Fieldman | H04L 12/1827 |
| 2008/0090219 A1 * | 4/2008 | Wilson | G09B 5/06 434/310 |
| 2008/0254431 A1 | 10/2008 | Woolf et al. | |
| 2013/0238520 A1 * | 9/2013 | Hall | G06Q 50/2053 705/327 |
| 2016/0011729 A1 * | 1/2016 | Flores | G06Q 30/0201 715/728 |
| 2016/0253912 A1 * | 9/2016 | Heilman | G09B 5/08 434/309 |
| 2020/0244380 A1 * | 7/2020 | Agrawal | G06F 3/0482 |
| 2022/0150287 A1 * | 5/2022 | Kasaba | H04L 12/1827 |
| 2022/0198952 A1 | 6/2022 | Jones et al. | |

FOREIGN PATENT DOCUMENTS

| CA | 3134605 | 10/2020 |
|---|---|---|
| KR | 2014013129 | 11/2014 |

* cited by examiner

*Primary Examiner* — Liang Y Li
(74) *Attorney, Agent, or Firm* — Riyon Rae Harding

(57) ABSTRACT

A method, a processing unit, a non-transitory computer-readable medium for providing recommendations in content rendering environment with presenter and attendees. For providing the recommendations, initially, user data is received for content rendering environment. The user data relates to the attendees. Further, the recommendations to the presenter are generated based on the user data. The recommendations are used to initiate interaction in the content rendering environment between the presenter and at least one selected attendee amongst the one or more attendees. The recommendations are provided to the presenter during rendering of the content to the one or more attendees. By the proposed system and method, the interaction between the presenter and the attendees may be enhanced and customized to be as per their preferences.

16 Claims, 15 Drawing Sheets

METHOD AND PROCESSING UNIT FOR PROVIDING RECOMMENDATIONS IN A CONTENT RENDERING ENVIRONMENT

FIELD OF THE PRESENT INVENTION

Embodiments of the present invention generally relate to rendering of content to a plurality of users with at least one presenter and one or more attendees. In particular, embodiments of the present invention relate to a method and processing unit for generating and providing recommendations to at least one presenter for initiating interaction between at least one presenter and one or more attendees.

BACKGROUND OF THE DISCLOSURE

In any content rendering environment with at least one presenter and one or more attendees comprising a plurality of users, content may be provided by the presenter to the one or more attendees. The content may include at least one of video data, audio data, images data, textual data, graphical data, and so on. Such content may be rendered to the one or more attendees via a transmission medium such as the Internet. The at least one presenter and the one or more attendees may connect with the content rendering environment to exchange the content. Some of the examples for such content rendering environment may be virtual/online classroom, a virtual meeting/group discussion, an online presentation, an online gaming platform, a virtual tour, or live streaming of a game and so on, where there is a presenter who presents the content to one or more attendees. In such content rendering environments, it may be significant that the at least one presenter initiates interactions with the one or more attendees to enhance the delivery of the content. For example, consider a virtual classroom environment with a lecturer and students. Initiating an interaction, by the lecturer, with students may make the classroom session more interesting to the students.

In some instances, the at least one presenter may have to voluntarily initiate the interaction with the one or more attendees as opposed to such initiation being automatic per the design of the system. Such initiated interactions may not be as per the preferences of the one or more attendees. Further, in an online/virtual platform, it may not be possible for the at least one presenter to monitor or keep track of real-time actions of the one or more attendees, wherein these real-time actions may bear on whether how and to whom the voluntarily initiated interactions should be made. Thus, voluntarily initiating interactions based on the real-time actions may not be possible by the at least one presenter. Some conventional systems provide recommendations to the presenter to alter or improve the delivery of the content, based on pre-defined metrics or real-time metrics associated with one or more attendees. Other conventional systems provide recommendations to the at least one presenter to interact with all of the one or more attendees, at an instant of time. Thus, in conventional systems, initiating interactions only with selected attendees and suggesting the type of interactions that are preferable by the selected attendee remains an unaddressed feature.

Therefore, there is a need for a method and processing unit which provides recommendations to the at the least presenter to initiate interaction with selected attendees, where the recommendations are generated for the selected attendees based on their real-time actions, preferences, and interests.

The information disclosed in this background of the disclosure section is only for enhancement of understanding of the general background of the disclosure and should not be taken as an acknowledgment or any form of suggestion that this information forms existing information already known to a person skilled in the art.

BRIEF SUMMARY OF THE DISCLOSURE

A method, a processing unit, and a non-transitory computer-readable medium for providing recommendations in a content rendering environment with a presenter and one or more attendees. For providing the recommendations, initially, user data is received for a content rendering environment with plurality of users comprising at least one presenter and one or more attendees. The user data relates to the one or more attendees. Further, the one or more recommendations to the at least one presenter are generated based on the user data. The one or more recommendations are used to initiate interaction in the content rendering environment between the at least one presenter and at least one selected attendee amongst the one or more attendees. The one or more recommendations are provided to the at least one presenter during rendering of the content to the one or more attendees.

In an embodiment of the present invention, the user data comprises at least one of real-time user actions of the one or more attendees during rendering of the content to the one or more attendees, and a pre-stored user profile of each of the one or more attendees. The pre-stored user profile indicates preferences with respect to content and characteristics of corresponding attendee.

In an embodiment of the present invention, monitoring of the real-time user actions of the one or more attendees is performed during rendering of the content to the one or more attendees. Such real-time user actions are used as the user data for generating the one or more recommendations.

In an embodiment of the present invention, the real-time user actions comprise at least one of eyeball movement, head movement, gesture, keyboard input, screen input, pointing device input, or voice input of the one or more attendees.

In an embodiment of the present invention, selecting the at least one selected attendee amongst the one or more attendees is performed based on the user data.

In an embodiment of the present invention, generating the one or more recommendations comprises analyzing the user data to determine a recommended presenter action to be performed by the at least one presenter. The recommended presenter action includes and enhances an interaction between the at least one presenter and the at least one selected attendee. Further, generating the one or more recommendations comprises identifying type of the recommended presenter action to be one of a private action and a public action based on the user data. The recommended presenter action is a public action when the presenter action is viewable by at least one other of the one or more attendees in addition to the at least one selected attendee. The recommended presenter action is a private action when the presenter action is viewable only by the at least one selected attendee. The one or more recommendations are generated based on the determined presenter action and the identified type of the presenter action.

In an embodiment of the present invention, the recommended presenter action comprises communicating, with the at least one selected attendee, at least one of audio data, textual data, supplementary data, graphical data, haptic data, video data and alert data.

In an embodiment of the present invention, the one or more recommendations are at least one of visual recommendations, audio recommendations and haptic recommendations.

The features and advantages of the subject matter hereof will become more apparent in light of the following detailed description of selected embodiments, as illustrated in the accompanying FIGURES. As one of ordinary skill in the art will realize, the subject matter disclosed herein is capable of modifications in various respects, all without departing from the scope of the subject matter. Accordingly, the drawings and the description are to be regarded as illustrative.

BRIEF DESCRIPTION OF THE DRAWINGS

The present subject matter will now be described in detail with reference to the drawings, which are provided as illustrative examples of the subject matter to enable those skilled in the art to practice the subject matter. It will be noted that throughout the appended drawings, features are identified by like reference numerals. Notably, the FIGURES and examples are not meant to limit the scope of the present subject matter to a single embodiment, but other embodiments are possible by way of interchange of some or all of the described or illustrated elements and, further, wherein.

DETAILED DESCRIPTION OF THE EMBODIMENTS

Figure 1:
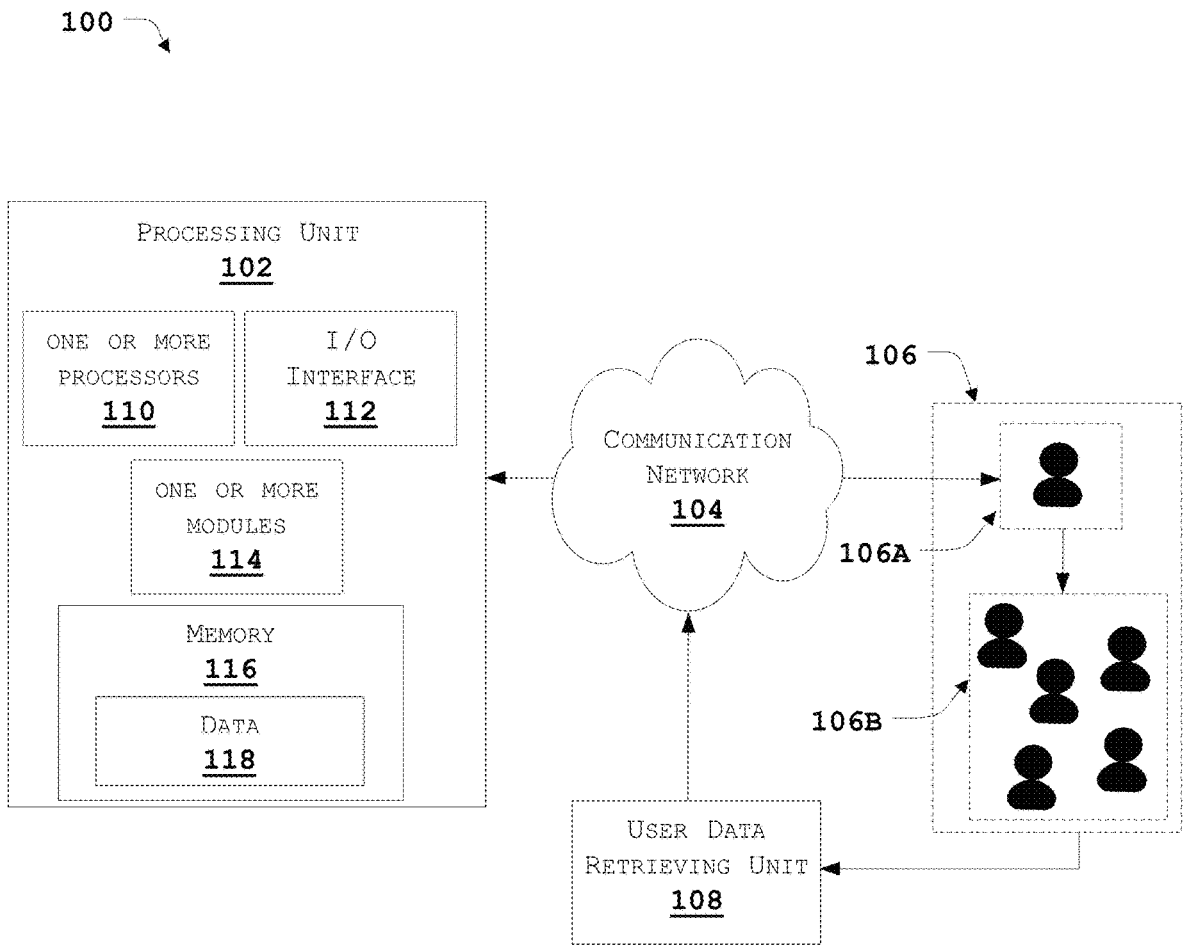
FIG. 1 illustrates an exemplary environment with a processing unit for providing recommendations in a content rendering environment, in accordance with an embodiment of the present invention.

The detailed description set forth below in connection with the appended drawings is intended as a description of exemplary embodiments in which the presently disclosed invention can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed invention. However, it will be apparent to those skilled in the art that the presently disclosed invention may be practiced without these specific details. In some instances, well-known structures and devices are shown in block diagram form in order to avoid obscuring the concepts of the presently disclosed invention.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software and/or firmware.

Embodiments of the present invention may be provided as a computer program product, which may include a non-transitory, machine-readable storage medium tangibly embodying thereon instructions, which may be used to program the computer (or other electronic devices) to perform a process. The machine-readable medium may include, but is not limited to, fixed (hard) drives, semiconductor memories, such as Read Only Memories (ROMs), Programmable Read-Only Memories (PROMs), Random Access Memories (RAMs), Erasable PROMs (EPROMs), Electrically Erasable PROMs (EEPROMs), flash memory or other types of media/machine-readable medium suitable for storing electronic instructions (e.g., computer programming code, such as software or firmware).

Various methods described herein may be practiced by combining one or more non-transitory, machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

It will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Embodiments of the present invention relate to a method, system, and processing unit for providing recommendations for a presenter action in a content rendering environment comprising at least one presenter and one or more attendees. In the present disclosure, one or more recommendations are generated and provided to the at least one presenter. The one or more recommendations are generated to provide interaction between the at least one presenter and the one or more attendees. The present disclosure uses user data which may include real-time actions and pre-stored user profiles of the attendees to select an attendee and generate a corresponding recommendation. By implementing the recommended presenter action in the content rendering environment, interaction between the presenter and the attendee is as per their preferences.

FIG. 1 illustrates an exemplary environment 100 with processing unit 102 for providing recommendations to a presenter in the content rendering environment, in accordance with an embodiment of the present invention. As shown in FIG. 1, the exemplary environment 100 comprises the processing unit 102, a communication network 104, a plurality of users 106, and a user data retrieving unit 108. The exemplary environment 100 may be the content rendering environment to which the plurality of users 106 is connected. In an embodiment, the content rendering environment may be any environment that renders content to one or more users. The content may include, but is not limited to, at least one of video data, audio data, images data, text data, graphics data, and so on. The content rendering environment may be, but is not limited to, an extended reality/immersive environment, a live-telecast environment, content streaming environment, visual communication environment, online gaming environment, messaging environment, voice-over IP communication facilitating environment, and so on. The content rendering environment may be an environment where at least one presenter 106A and one or more attendees 106B are connected to receive the content. Usually, at least one presenter 106A may be presenting the content to the one or more attendees 106B in such an environment. Alternatively, the at least one presenter 106A and the one or more attendees 106B amongst the plurality of users 106 may not be pre-defined. Based on access provided by the content rendering environment and the requirements, any user, amongst the plurality of users 106, may be the at least one presenter 106A and others may be the one or more attendees 106B, at any instant of time during rendering of the content. In an embodiment, the content rendering environment may be a real-time communication session established amongst the plurality of users 106. The content may be, but is not limited to, real-time dynamically generated data, replayed data, pre-defined data, pre-stored data, live telecast data, and so on, that may be presented to the one or more attendees 106B by the at least one presenter 106A. In an embodiment, the plurality of users 106 may be connected to the content rendering environment via user devices. The user devices may be, but are not limited to, at least one of a smartphone, a head-mounted device, smart glasses, a television, a PC, tablet, laptop, and so on. In an embodiment, each of the plurality of users 106 may be associated with a dedicated user device. In an alternate embodiment, the at least one presenter 106A may be associated with a dedicated user device, and the one or more attendees 106B may be associated with one or more user devices.

The proposed processing unit 102 and method may be implemented in such an environment that renders the content to the plurality of users 106 including the at least one presenter 106A and the one or more attendees 106B. The content may be rendered to the user devices of the plurality of users 106. The processing unit 102 may be configured to provide one or more recommendations to the at least one presenter 106A during rendering of the content in the content rendering environment. In an embodiment, the processing unit 102 may be communicatively coupled with the user devices of the plurality of users 106. In an embodiment, the processing unit 102 may be implemented as a cloud-based server that is configured to communicate with each of the user devices, for providing the one or more recommendations. In an alternate embodiment, the processing unit 102 may be part of a user device associated with the at least one presenter 106A (not shown in the Figure). In such embodiment, the processing unit 102 may be configured to communicate with the user devices of the one or more attendees 106B and may be configured to generate and provide the one or more recommendations.

In an embodiment, for providing the one or more recommendations, the processing unit 102 may be configured to function in real-time, when the at least one presenter 106A is presenting the content to the one or more attendees 106B. During presenting of the content by the at least one presenter 106A, the one or more recommendations may be generated and be provided to the presenter by the processing unit 102. The processing unit 102 may be in communication with the user device associated with the at least one presenter 106A from the plurality of users 106, to provide the one or more recommendations.

Further, the processing unit 102 may be in communication with the user data retrieving unit 108 to receive user data. The user data may be related to the one or more attendees 106B. The processing unit 102 may generate the one or more recommendations based on the user data. In an embodiment, the processing unit 102 may be connected with the user device associated with the at least one presenter 106A and the user data retrieving module via the communication network 104. The communication network 104 may include, without limitation, a direct interconnection, a Local Area Network (LAN), a Wide Area Network (WAN), a wireless network (e.g., using Wireless Application Protocol), the Internet, and the like. In an alternate embodiment, the processing unit 102 may be connected with each of said user device, and the user data retrieving unit 108 via a corresponding dedicated communication network.

Figure 2:
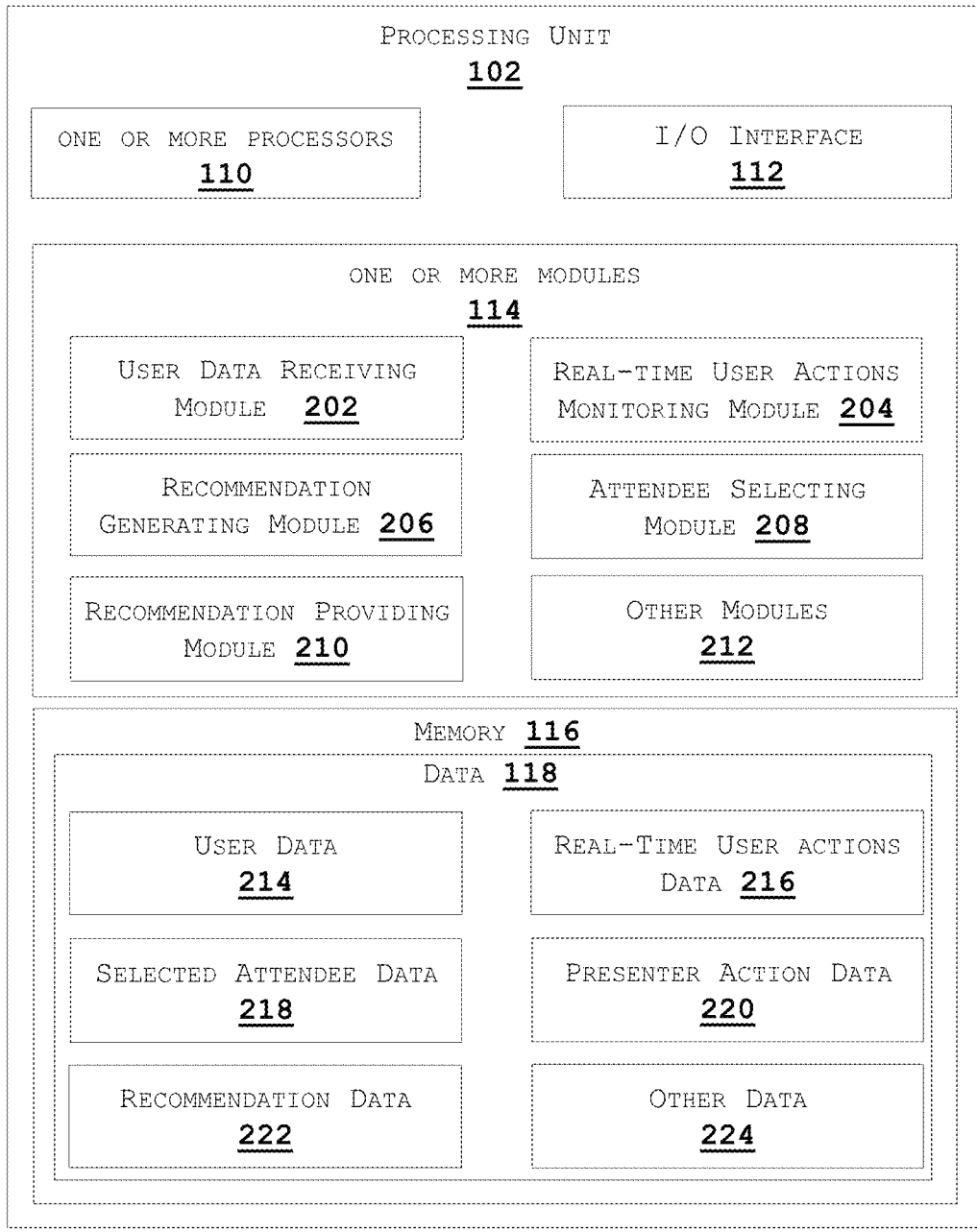
FIG. 2 illustrates a detailed block diagram showing functional modules of a processing unit for providing recommendations in a content rendering environment, in accordance with an embodiment of the present invention.

FIG. 2 shows a detailed block diagram of the processing unit 102 for providing the one or more recommendations in the content rendering environment, in accordance with some non-limiting embodiments or aspects of the present disclosure. The processing unit 102 may include one or more processors 110, an Input/Output (I/O) interface 112, one or more modules 114, and a memory 116. In some non-limiting embodiments or aspects, the memory 116 may be communicatively coupled to the one or more processors 110. The memory 116 stores instructions, executable by the one or more processors 110, which on execution, may cause the processing unit 102 to generate and provide the one or more recommendations. In some non-limiting embodiments or aspects, the memory 116 may include data 118. The one or more modules 114 may be configured to perform the steps of the present disclosure using the data 118 to generate and provide the one or more recommendations. In some non-limiting embodiments or aspects, each of the one or more modules 114 may be a hardware unit, which may be outside the memory 116 and coupled with the processing unit 102. In some non-limiting embodiments or aspects, the processing unit 102 may be implemented in a variety of computing systems, such as a laptop computer, a desktop computer, a Personal Computer (PC), a notebook, a smartphone, a tablet, e-book readers, a server, a network server, a cloud server, and the like. In a non-limiting embodiment, each of the one or more modules 114 may be implemented with a cloud-based server, communicatively coupled with the processing unit 102.

The data 118 in the memory 116 and the one or more modules 114 of the processing unit 102 are described herein in detail. In one implementation, the one or more modules 114 may include, but is not limited to, a user data receiving module 202, a real-time user actions monitoring module 204, a recommendation generation module 206, an attendee selecting module 208, a recommendation providing module 210, and one or more other modules 212 associated with the processing unit 102. In some non-limiting embodiments or aspects, the data 118 in the memory 116 may include user data 214, real-time user actions data 216 (herewith also referred to as real-time user actions 216), selected attendee data 218 (herewith also referred to like at least one selected attendee 218), presenter action data 220, recommendation data 222 (also referred to as one or more recommendations 222), and other data 224 associated with the processing unit 102.

In some non-limiting embodiments or aspects, the data 118 in the memory 116 may be processed by the one or more modules 114 of the processing unit 102. In some non-limiting embodiments or aspects, the one or more modules 114 may be implemented as dedicated units and when implemented in such a manner, the modules may be configured with the functionality defined in the present disclosure to result in novel hardware. As used herein, the term module may refer to an Application Specific Integrated Circuit (ASIC), an electronic circuit, Field-Programmable Gate Arrays (FPGA), a Programmable System-on-Chip (PSoC), a combinational logic circuit, and/or other suitable components that provide the described functionality. The one or more modules 114 of the present disclosure control the access to the virtual and real-world environment. The one or more modules 114 along with the data 118, may be implemented in any system for generating and providing the one or more recommendations 222 to the at least one presenter 106A in the content rendering environment.

Initially, for providing the one or more recommendations 222, the user data receiving module 202 may be configured to receive the user data 214 for the content rendering environment. In an embodiment, the user data receiving module 202 may be in communication with the user data retrieving module 108 to receive the user data 214. The user data retrieving module 108 may be configured to be in communication with each of user devices associated the one or more attendees 106B amongst the plurality of users 106, to retrieve the user data 214. In a non-limiting embodiment, the user data 214 comprises at least one of real-time user actions 216 of the one or more attendees 106B during rendering of the content to the one or more attendees 106B, and a pre-stored user profile of each of the one or more attendees 106B.

The real-time user actions 216 may be actions of the one or more attendees 106B when presented with the content from the at least one presenter 106A. In an embodiment, the real-time user actions 216 comprises at least one eyeball movement, head movement, gesture, keyboard input, screen input, pointing device input, or voice input of the one or more attendees 106B. In an embodiment, the real-time user actions 216 may be any user activity that can be sensed via any I/O hardware or software associated with corresponding user device. In an embodiment, the real-time user actions monitoring module 204 may be configured to monitor real-time user actions 216 of the one or more attendees 106B during rendering of the content to the one or more attendees 106B. One or more sensors may be coupled with each of the user devices to monitor the real-time user actions 216 of corresponding attendee. In a non-limiting embodiment, the one or more sensors may include, but are not limited to, one or more cameras, tilt sensors, accelerometers, movement detectors, keyboard or mouse sensors, microphone-based sensors, and so on. One or more other sensors, known to a person skilled in the art, may be used to monitor the real-time user actions 216 of the one or more attendees 106B. In an embodiment, the one or more sensors may communicate sensed data dynamically to the user data retrieving module 108. The real-time user action monitoring module 204 may receive the sensed data from the user data retrieving module 108 and analyze the sensed data to identify the real-time user actions 216. In an embodiment, the one or more sensors may be integral part of the user data retrieving module 108. The identified real-time user actions 216 may be stored in the user data retrieving module 108 and be received by the real-time user action monitoring module 204. In an embodiment, the user data retrieving module 108 may function as a storage device which may include, without limitation, a cache, or a buffer, which temporally stores the real-time user actions 216. Such stored real-time user actions 216 may be communicated with the user data receiving module 202 dynamically in real-time, for generating the one or more recommendations 222. In an alternate embodiment, the user data retrieving module 108 may be part of the processing unit 102 and is communicatively coupled with the one or more sensors of the user devices.

The pre-stored user profile indicates preferences with respect to content and characteristics of each of the one or more attendees 106B. In an embodiment, the pre-stored user profile may be generated based on historic data associated with the one or more attendees 106B. In an embodiment, the characteristics of the one or more attendees 106B may be determined using the historic data comprising user actions of the one or more attendees 106B recorded during previous rendering of the content. In an alternate embodiment, preferences may be inputted by the one or more attendees 106B. In an embodiment, the preferences may be determined using the historic data. One or more techniques, known to a person skilled in the art, may be used to generate and store the pre-stored user profile. In an embodiment, the user data retrieving module 108 may be configured to generate and store the pre-stored user profile of each of the one or more attendees 106B. Such pre-stored user profile may be received by the user data receiving module 202 when generating the one or more recommendations 222.

In an embodiment, the user data receiving module 202 may be configured to continuously receive the user data 214, during rendering of the content, in real-time. The recommendation generation module 206 may be configured to analyze the received user data 214 to detect the trigger for generating the one or more recommendations 222. One or more recommendations 222 may be generated based on the real-time user actions 216 or the pre-stored user profile. For example, when an attendee is sleeping, the real-time user action of such attendee may indicate that the attendee is dozing off during the presentation and hence the one or more recommendations 222 may be generated to initiate interaction between the presenter and the attendee. Consider another example where when a presentation for a particular topic is presented by the presenter and an attendee inputted a preference to receive supplementary notes on said topic. In such a case, a recommendation may be generated to the presenter to share the supplementary notes or other such supplementary data for the topic with the attendee.

The one or more recommendations 222 are used to initiate interaction in the content rendering environment between the at least one presenter 106A and the at least one selected attendee 218 amongst the one or more attendees 106B. In an embodiment, the recommendation generation module 206 may be configured to generate the one or more recommendations 222 by analyzing the user data 214 to determine a presenter action to be performed by the at least one presenter 106A. The presenter action includes an interaction between the at least one presenter 106A and the at least one selected attendee 218. The presenter action may be the action that is to be performed by the presenter to initiate the interaction with the one or more attendees 106B. For example, the presenter action comprises communicating, with the at least one selected attendee 218, at least one of audio data, textual data, supplementary data, graphical data, haptic data, video data and alert data.

Further, the type of presenter action is identified for the determined presenter action. In an embodiment, the type of presenter action may be identified to be one of a private action and a public action. In an embodiment, the type of presenter action may be identified based on the user data 214. Preferably, the type of presenter action may be identified using the pre-stored user profile of the user data 214. In an embodiment, the type of the presenter action may be identified based on the preference selected by an attendee. The presenter action may be identified to be the public action when the presenter action may be viewable by the one or more attendees 106B. The presenter action may be identified to be the private action when the presenter action may be viewable by at least one selected attendee 218. The one or more recommendations 222 are generated based on the determined presenter action and the identified type of the presenter action. In an embodiment, the presenter action and the type of presenter action identified by the recommendation generation module 206 may be stored as the presenter action data 220 in the memory 116.

In an embodiment, the attendee selecting module 208 may be further configured to select the at least one selected attendee 218 amongst the one or more attendees 106B based on the user data 214. In an embodiment, the at least one selected attendee 218 may be selected based on the real-time user actions 216 or the pre-stored user profile. For example, when an attendee is identified to be dozing off, there is a need to initiate interaction with such attendee. Thus, the attendee selecting module 208 may select such attendee as the at least one selected attendee 218. Consider another example where pre-stored user profile of an attendee indicates that the attendee prefers to receive additional content. Such attendee may be selected as the at least one selected attendee. In an embodiment, the attendee selecting module 208 may select more than one attendee to be the at least one selected attendee 218, at an instant of time. In such case, multiple recommendations may be generated to initiate the interaction between the at least one presenter 106A and each of selected attendees. In an embodiment, when the recommendations generated for the multiple attendee is similar, in such a case a single recommendation may be generated and provided to the at least one presenter 106A. Interaction with each of the multiple attendees may be as per the preferences of the respective attendees. For example, consider first attendee, second attendee and third attendees are dozing off during the presentation. A single recommendation to wake the first attendee, the second attendee and the third attendees may be sent to the at least one presenter. However, if the first attendee prefers to be privately interacted and the second attendee and the third attendee prefer to be publicly interacted, alert may be privately sent to the first attendee and publicly sent to the second attendee and the third attendee.

Upon generating the one or more recommendations 222, the recommendation providing module 210 may be configured to provide the one or more recommendations 222 to the at least one presenter 106A during rendering of the content to the one or more attendees 106B. In an embodiment, the one or more recommendations 222 are at least one of visual recommendations, audio recommendations and haptic recommendations. The recommendation providing module 210 may be configured to use and provide the one or more recommendations 222 in form of visual data, an audio data, or a haptic data. The visual recommendations may be displayed on screen viewed by the at least one presenter 106A. The audio recommendations may be provided to the at least one presenter 106A via a speaker of the corresponding user device. The haptic recommendation may be in form of vibrotactile simulated on the user device of the at least one presenter 106A. In an embodiment, the one or more recommendations 222 may be provided with one or more options to be selected by the at least one presenter 106A. The one or more options may be related to actions that the at least one presenter 106A may perform based on the one or more recommendations 222. When an option is selected from the one or more options, the content rendering environment may redirect to perform the action associated with the selected option. The actions may include, enabling verbal communication, sending data, sending alert, sending message and so on.

Figure 3A:
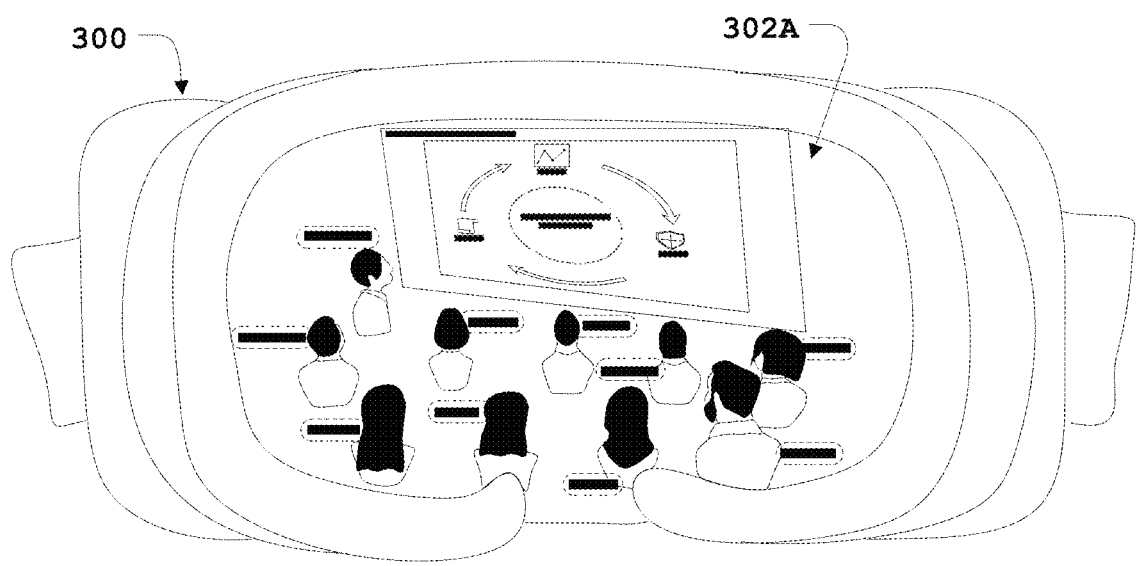
FIGS. 3A-3H show exemplary embodiments of a use case for providing recommendations in a content rendering environment, in accordance with an embodiment of the present invention.
Figure 3B:
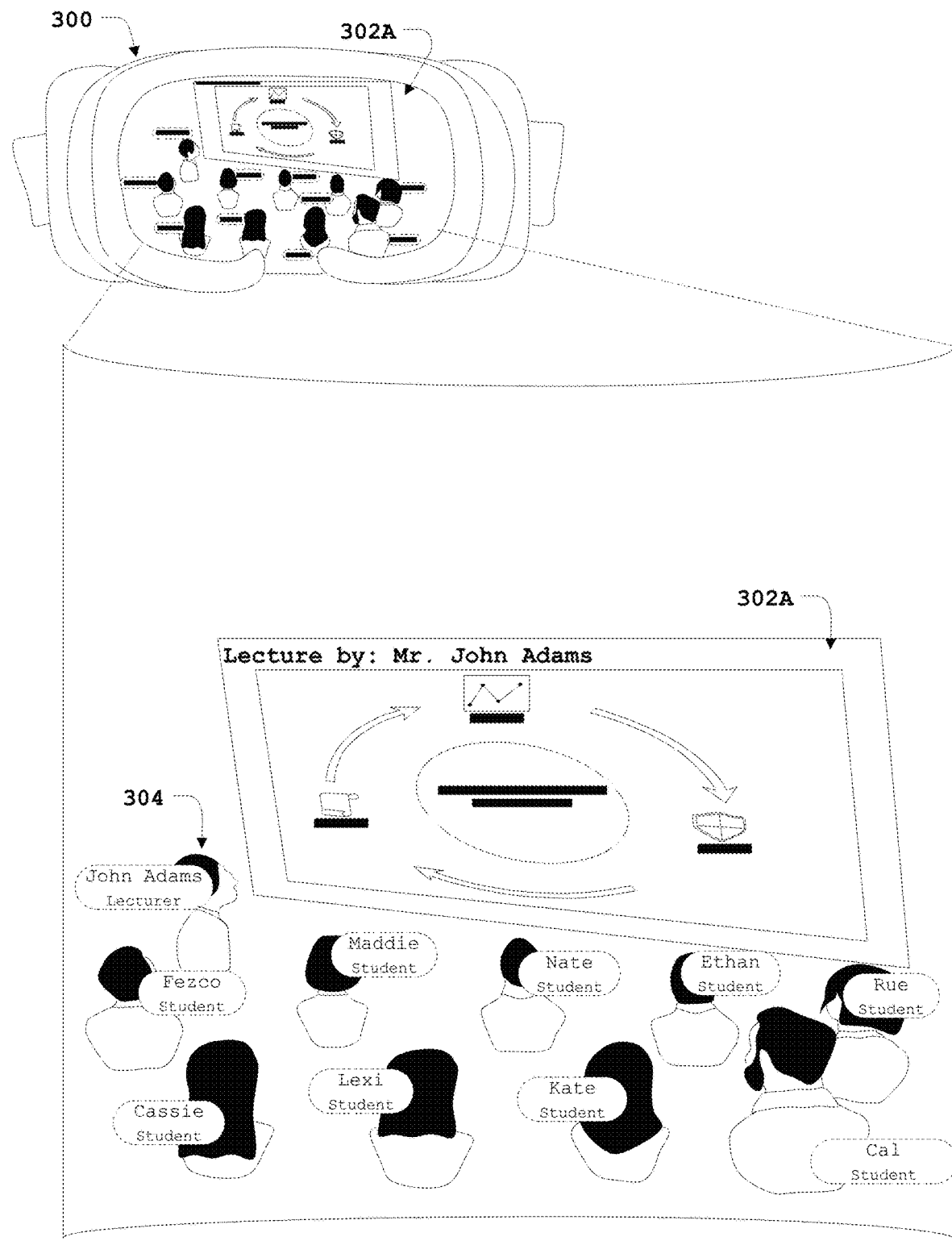
Figure 3C:
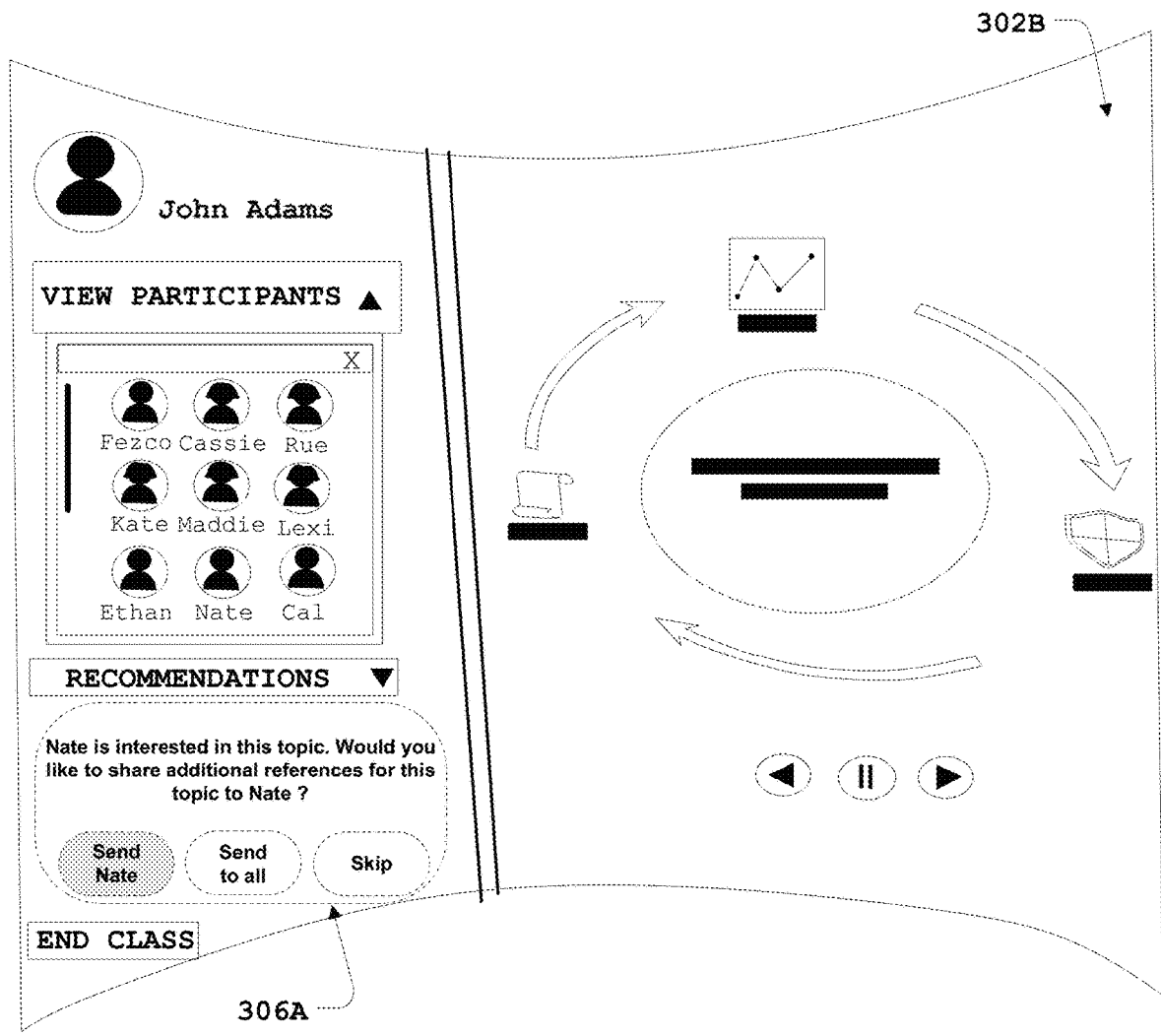
Figure 3D:
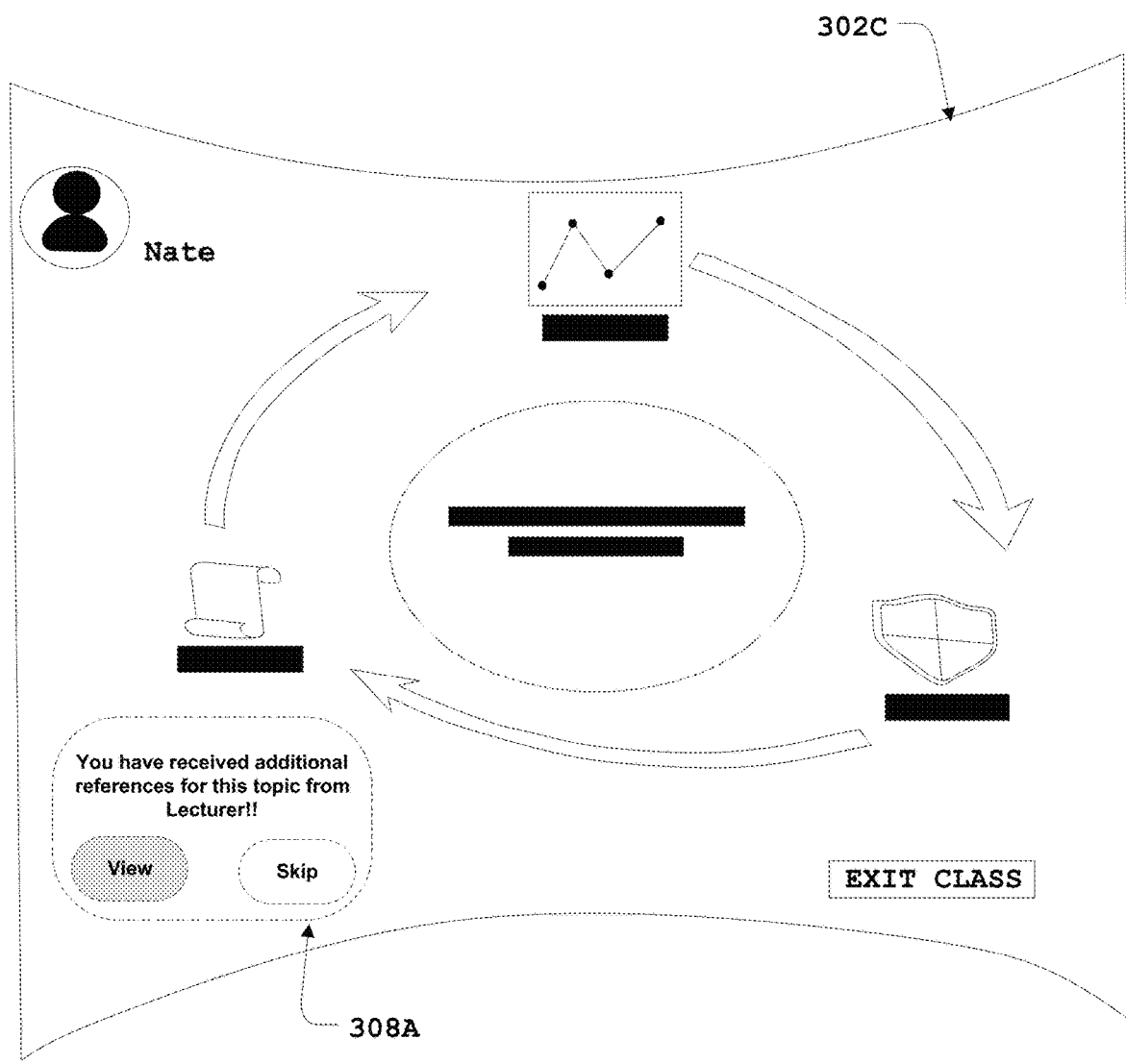
Figure 3E:
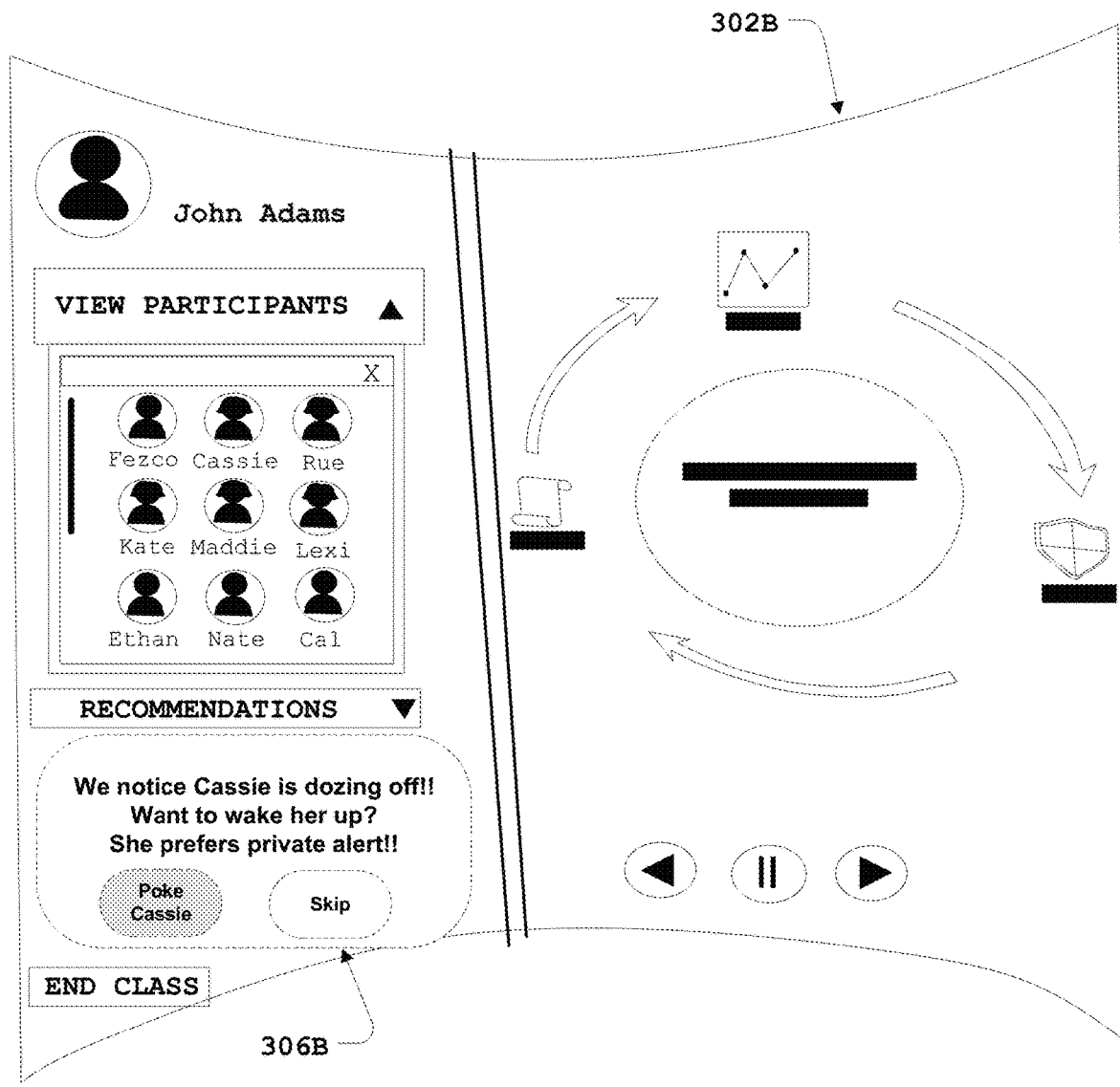

In the embodiment illustrated in FIGS. 3B-3H, a use case implementing the proposed processing unit 102 is shown. This use case is related to a virtual classroom scenario with a lecturer 304 and students. The virtual classroom may be experienced by wearing a Head-Mounted Display (HMD) 300 as shown in FIGS. 3A and 3B. Display 302A is the point of view of one of the students in the virtual classroom. Display 302B in FIG. 3C shows a point of view of the lecture when receiving a recommendation from the processing unit 102. Consider, during the lecture, student Nate has shown interest in the presented topic and prefers to receive additional references for the topic. Such preferences and interests may be stored as the user data 214. Further, Nate may be a student who prefers to get interacted privately. Such preference may also be stored as the user data 214. When the topic of interest of Nate is being lectured, a recommendation 306A as shown in the display 302B may be generated and provided to the lecturer 304. The recommendation may be generated in such a manner that the lecturer 304 may privately interact with Nate. The recommendation 306A may be provided with options to take necessary action by the lecturer 304. Consider that lecturer 304 selects an option to send the additional references to Nate. A notification 308A as shown in display 302C in FIG. 3D may be sent to Nate.

Figure 3F:
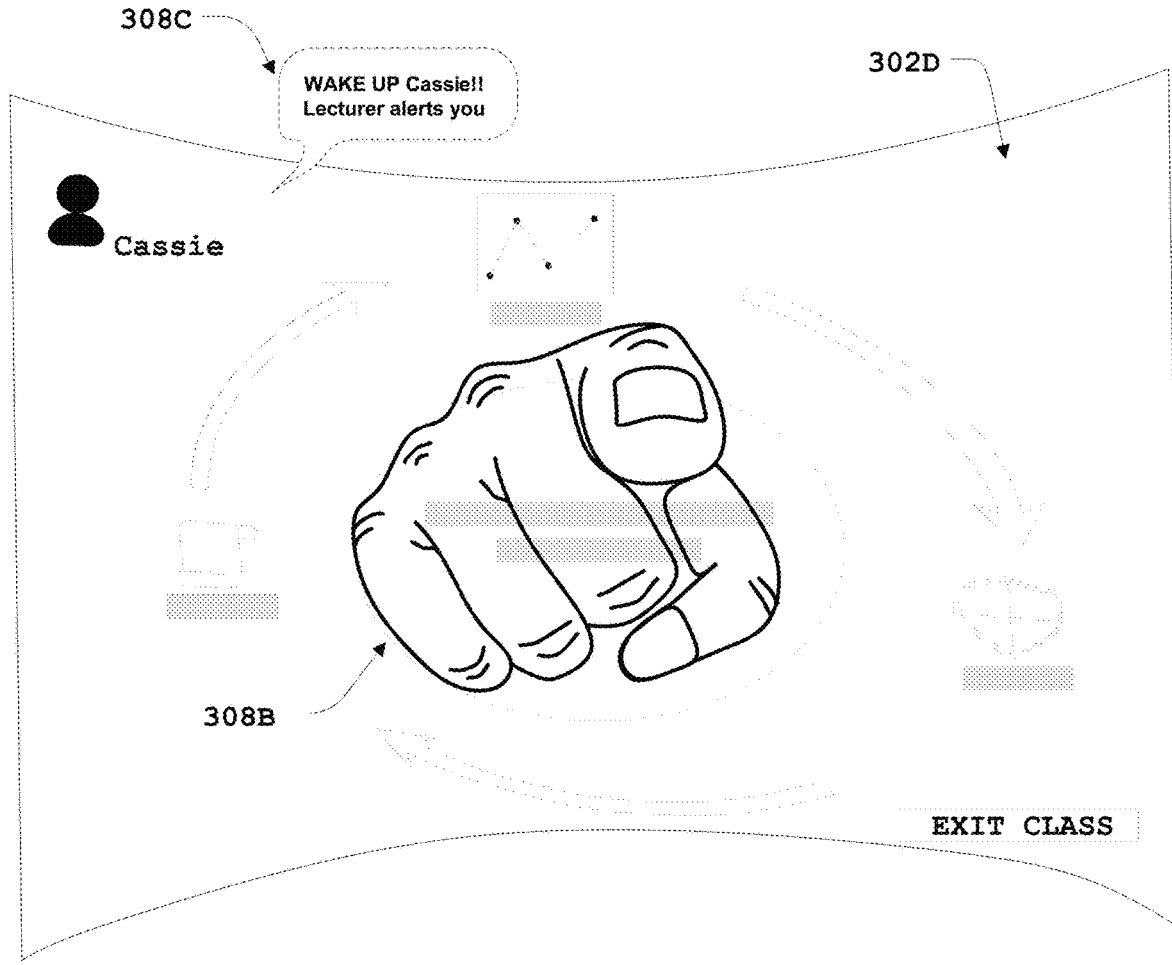
Figure 3G:
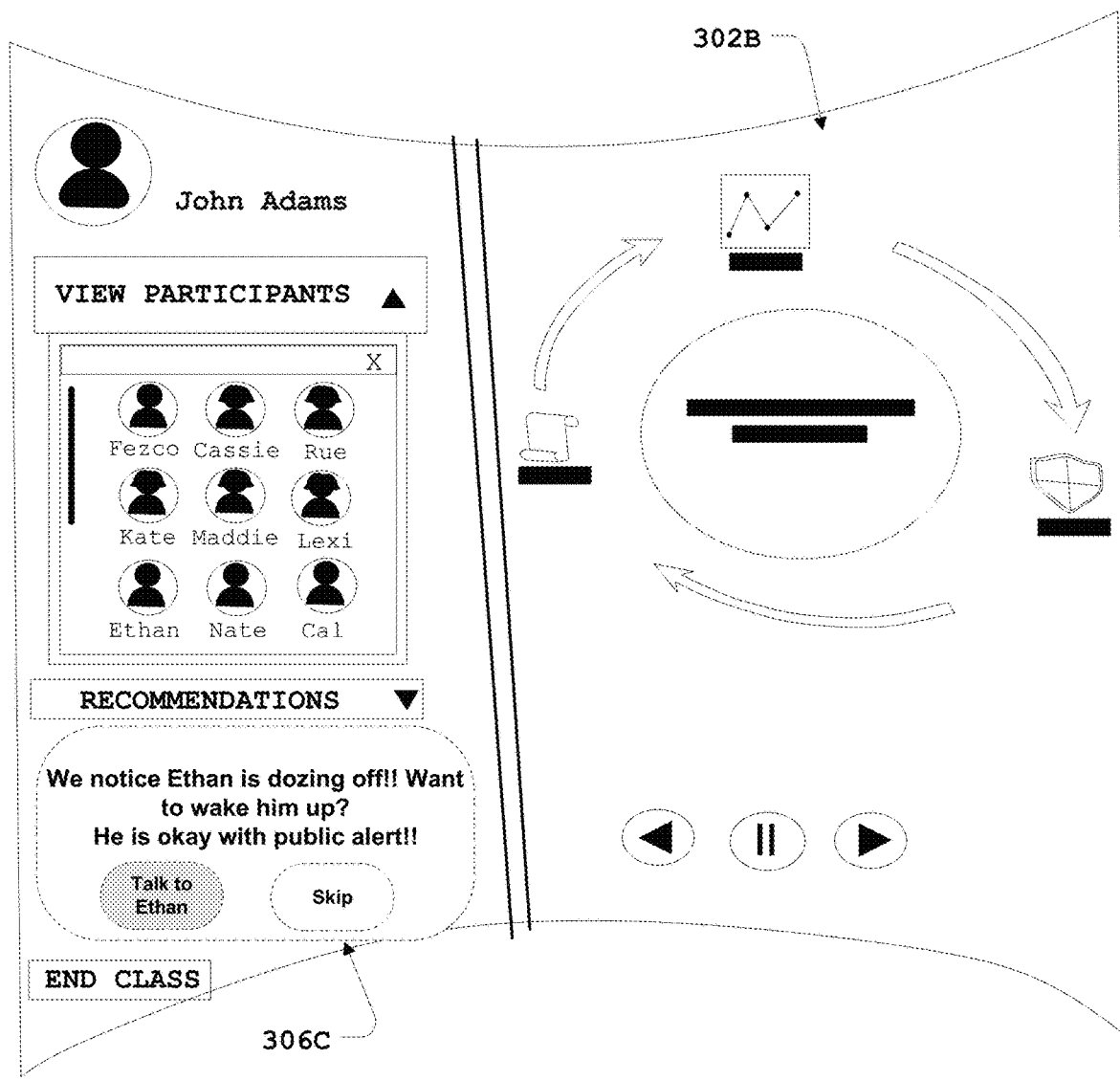
Figure 3H:
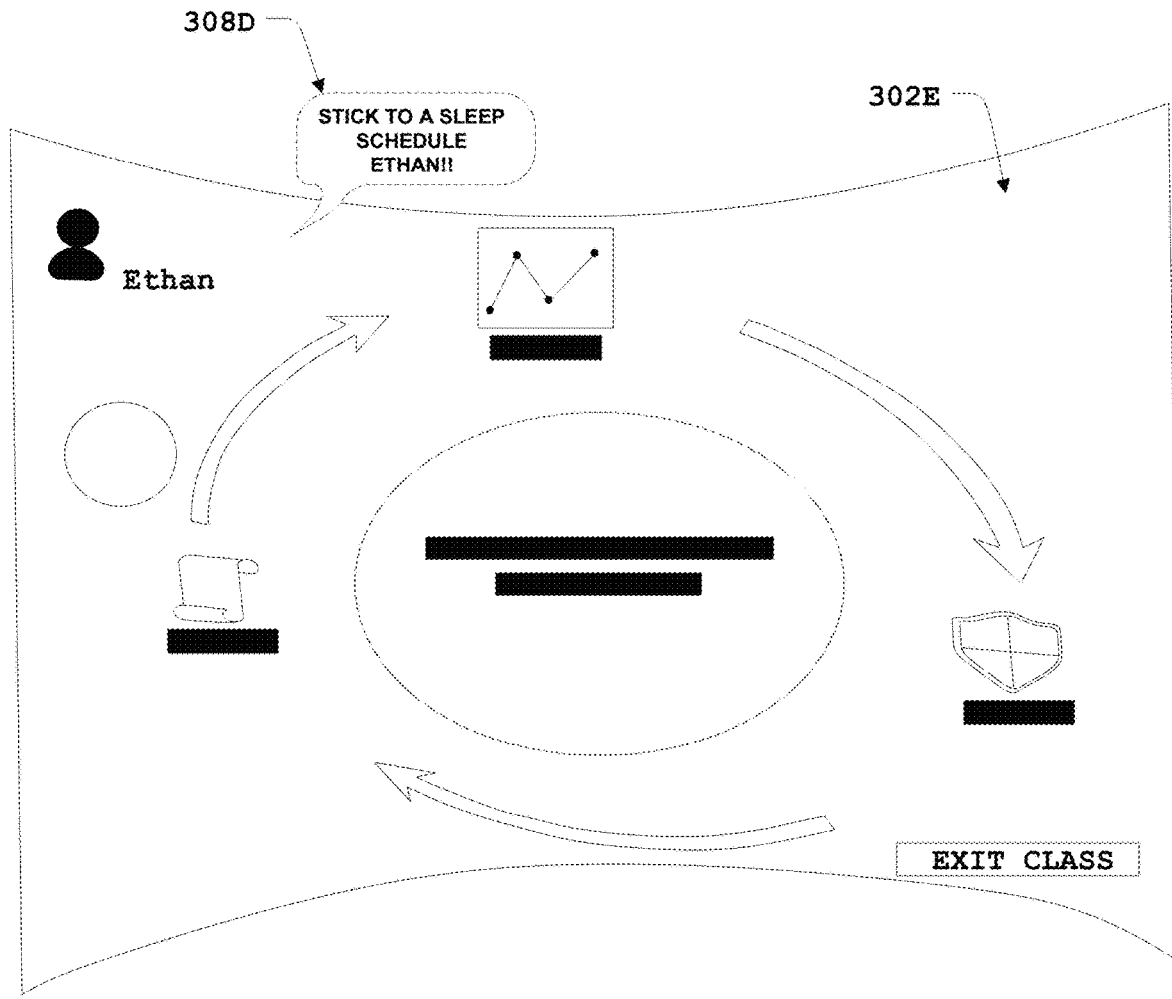

Consider at another instant of time, based on the user data 214, it is identified that student Cassie is dozing off during the lecture. Further, Cassie may be a student who prefers to get interacted privately. A recommendation 306B as shown in display 302B of FIG. 3E may be provided to the lecturer 304. The lecture may be provided with an option to alert Cassie. The alert may be in form of graphical representation, a notification, or a message. The alert may also be an audio alert or haptic alert. For example, the user device of the attendee may be sent a signal to vibrate and alert the attendee. Consider the lecturer 304 decides to alert Cassie. The alert sent to Cassie may be as shown in FIG. 3F. The alert may include graphical representation 308B of finger poke as shown in display 302D along with audio alert or haptic alert 308C, which is sent privately to Cassie. Alternatively, the alert may be virtual slap, virtual duster thrown at a student, and so on.

Consider at another instant of time, based on the user data 214, it is identified that student Ethan is dozing off during the lecture. Further, Ethan may be a student who prefers to get interacted publicly. A recommendation 306C is shown in display 302B of FIG. 3E may be provided to the lecturer 304. The lecture may be provided an option to alert Ethan publicly. The alert 308D, as shown in display 302E in FIG. 3h, may include audio alert which may be sent to all the one or more attendees 106B including Ethan.

Figure 4:
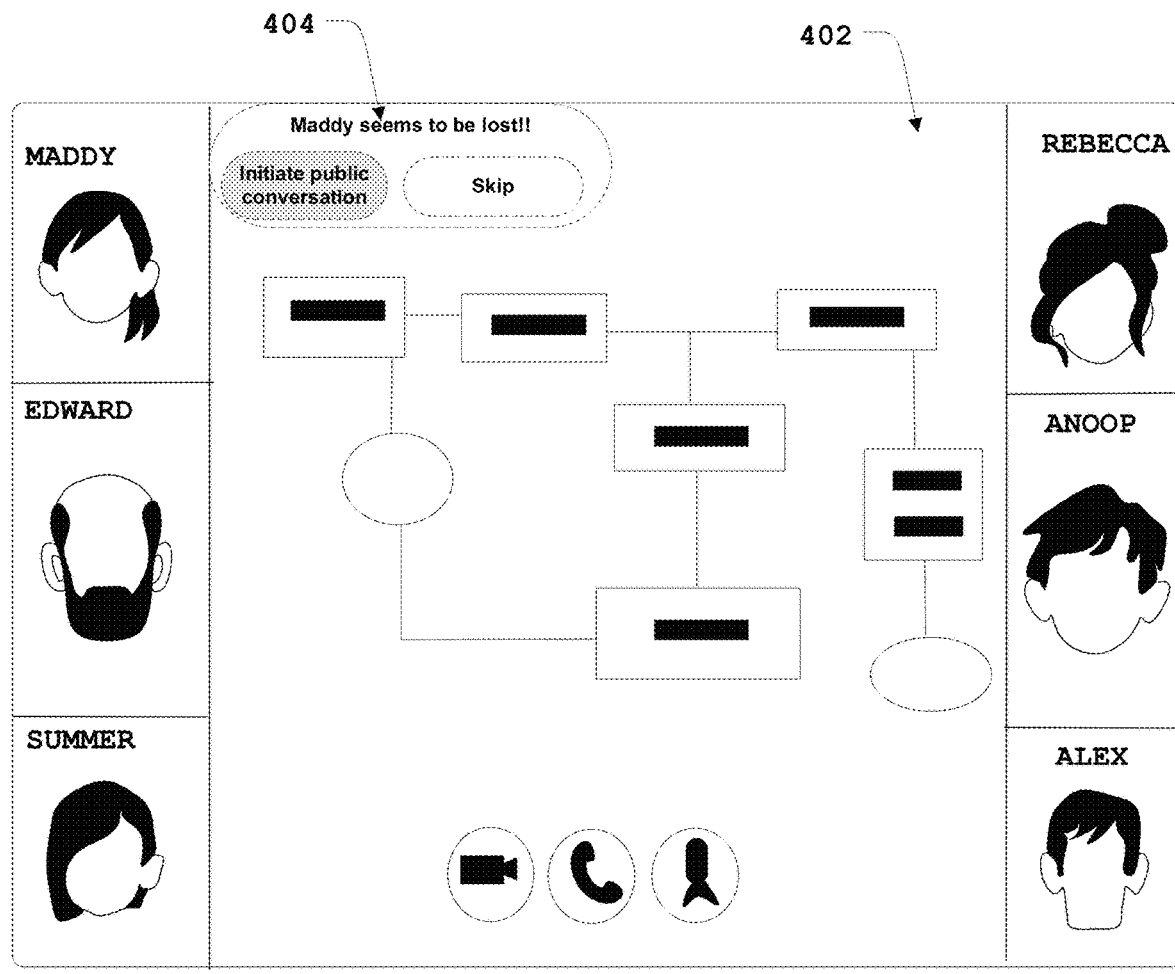
FIG. 4 shows an exemplary embodiment of another use case for providing recommendations in a content rendering environment, in accordance with an embodiment of the present invention.
Figure 5:
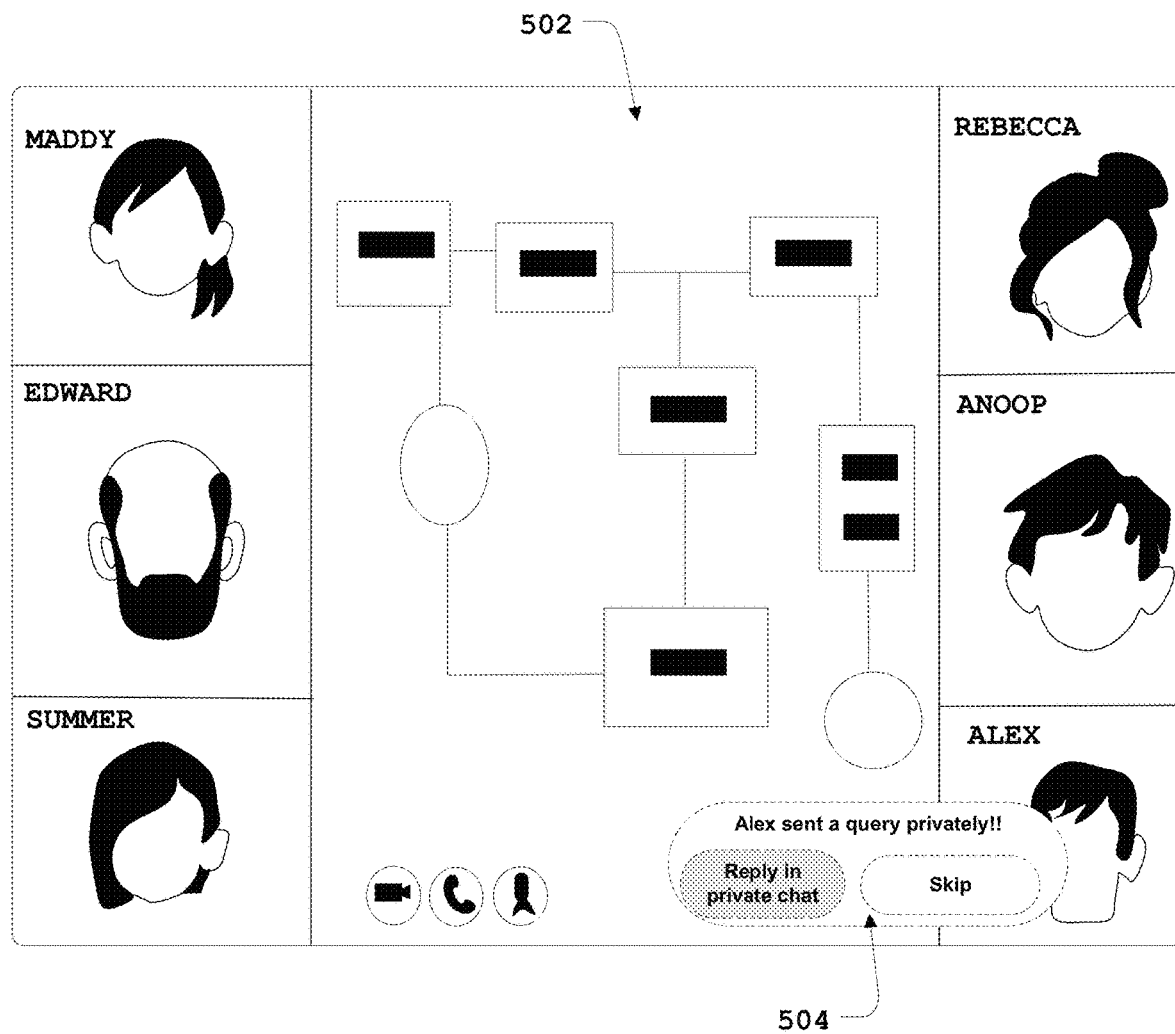
FIG. 5 shows an exemplary embodiment of another use case for providing recommendations in a content rendering environment, in accordance with an embodiment of the present invention.

FIGS. 4 and 5 shows another use case of implementing the proposed processing unit 102. Consider the content rendering environment as an online presentation with a presenter and one or more attendees 106B. The user data 214 of the one or more attendees 106B may be received and used to select attendees for generating the recommendations to the presenter. Consider, at an instant of time, as shown in display 402 of the presenter in FIG. 4, a recommendation 404 may be generated when an attendee Maddy is monitored to be not concentrating on the presentation. Maddy may prefer to interact publicly. Thus, a recommendation 404 may be generated to enable public interaction between the presenter and Maddy. Similarly, at another instant of time, as shown in display 502 of the presenter in FIG. 5, a recommendation 504 may be generated when an attendee Alex sent outs a private query to the presenter. Alex may prefer to interact privately. Thus, a recommendation 504 may be generated to enable private interaction between the presenter and Alex.

Figure 6:
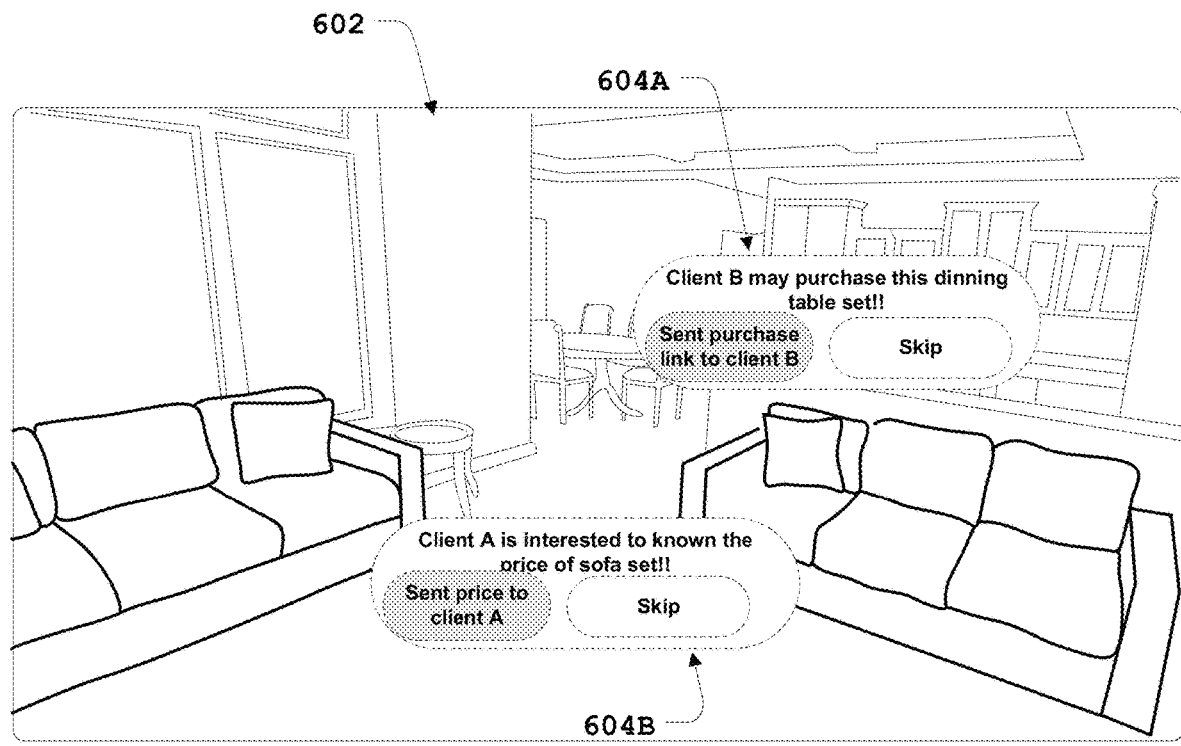
FIG. 6 shows an exemplary embodiment of another use case for providing recommendations in a content rendering environment, in accordance with an embodiment of the present invention.

FIG. 6 shows another use case of implementing the proposed processing unit 102. Consider the content rendering environment as a virtual tour of a furniture store provided by an agent to client A and client B. The user data 214 for both client A and client B may be received. The user data 214 of client A may indicate that user is searching online for a price of the displayed sofa set. The user data 214 of client B may indicate that he is conversing with someone to purchase the table set. Thus, the one or more recommendations 222 may be generated as recommendations 604A and 604B and provided to the agent on display 602 viewed by the agent. These recommendations aid in initiating interactions with client A and client B as per their preferences and interests.

In some non-limiting embodiments or aspects, the processing unit 102 may receive data for rendering data in the content rendering environment via the I/O interface 112. The received data may include, but is not limited to, at least one of the user data 214, the real-time user action data 216, and the like. Also, the processing unit 102 may transmit data for rendering data in the content rendering environment via the I/O interface 112. The transmitted data may include, but is not limited to, the selected attendee data 218, presenter action data 220, recommendation data 222, and the like.

Figure 7:
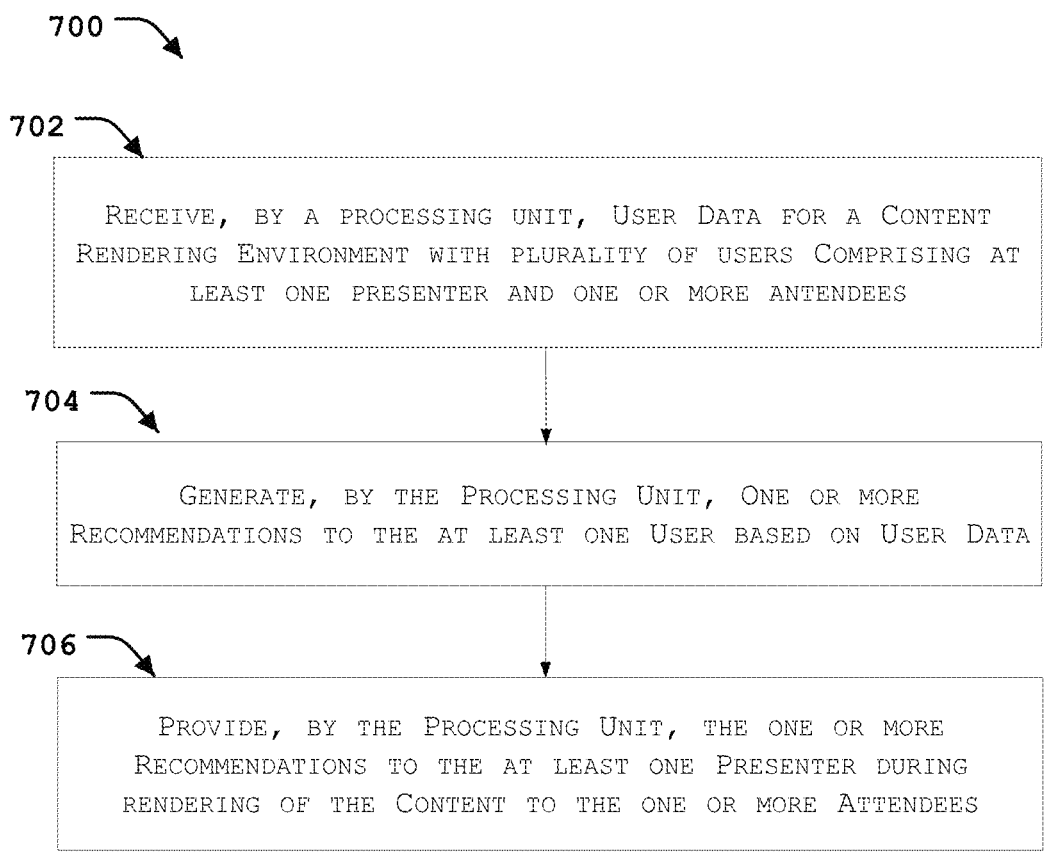
FIG. 7 is an exemplary process of processing unit for providing recommendations in a content rendering environment, in accordance with an embodiment of the present invention.

The other data 224 may comprise data, including temporary data and temporary files, generated by modules for performing the various functions of the processing unit 102. The one or more modules 114 may also include other modules 212 to perform various miscellaneous functionalities of the processing unit 102. It will be appreciated that such modules may be represented as a single module or a combination of different modules FIG. 7 shows an exemplary process of a processing unit 102 for providing recommendations to an at least one presenter based on real time actions of attendees in the content rendering environment, in accordance with an embodiment of the present disclosure. Process 700 for providing recommendations in a content rendering environment with a presenter and one or more attendees includes steps coded in form of executable instructions to be executed by a processing unit associated with the content rendering environment with the at least one presenter and the one or more attendees. At block 702, the processing unit is configured to receive user data for a content rendering environment with plurality of users comprising at least one presenter and one or more attendees, wherein the user data relates to the one or more attendees. In a non-limiting embodiment, the user data comprises at least one of real-time user actions of the one or more attendees during rendering of the content to the one or more attendees, and a pre-stored user profile of each of the one or more attendees. The pre-stored user profile indicates preferences with respect to content and characteristics of corresponding attendee. In an embodiment, the processing unit may be configured to monitor real-time user actions of the one or more attendees during rendering of the content to the one or more attendees. The real-time user actions are used as the user data for generating the one or more recommendations. The real-time user actions comprise at least one of eyeball movement, head movement, gesture, keyboard input, screen input, pointing device input, or voice input of the one or more attendees.

At block 704, the processing unit is configured to generate one or more recommendations to the at least one presenter, based on the user data. The one or more recommendations are used to initiate interaction in the content rendering environment between the at least one presenter and at least one selected attendee amongst the one or more attendees. The one or more recommendations are generated by analyzing the user data to determine a presenter action to be performed by the at least one presenter, wherein the presenter action includes an interaction between the at least one presenter and the at least one selected attendee. Further, the type of the presenter action is identified to be one of private action and a public action based on the user data. The presenter action is the public action when the presenter action is viewable by the one or more attendees. The presenter action is the private action when the presenter action is viewable only by the at least one selected attendee. The one or more recommendations are generated based on the determined presenter action and the identified type of the presenter action. The presenter action comprises communicating, with the at least one selected attendee, at least one of audio data, textual data, supplementary data, graphical data, haptic data, video data and alert data. In an embodiment, the processing unit may be further configured to select the at least one selected attendee amongst the one or more attendees based on the user data, to provide the one or more recommendations to the at least one selected attendee.

At block 706, the processing unit is configured to provide, by the processing unit, the one or more recommendations to the at least one presenter during rendering of the content to the one or more attendees. In an embodiment, the one or more recommendations are at least one of visual recommendation and audio recommendation.

Figure 8:
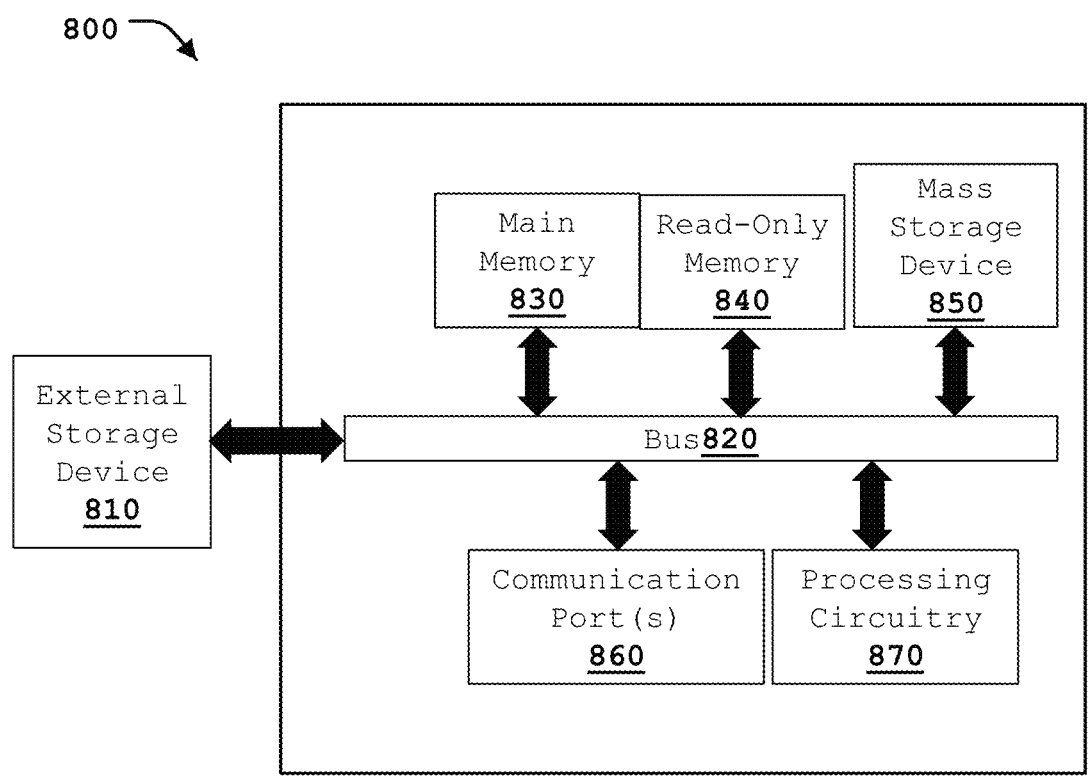
FIG. 8 illustrates an exemplary computer unit in which or with which embodiments of the present invention may be utilized.

FIG. 8 illustrates an exemplary computer system in which or with which embodiments of the present invention may be utilized. Depending upon the particular implementation, the various process and decision blocks described above may be performed by hardware components, embodied in machine-executable instructions, which may be used to cause a general-purpose or special-purpose processor programmed with the instructions to perform the steps, or the steps may be performed by a combination of hardware, software and/or firmware. As shown in FIG. 8, the computer system 800 includes an external storage device 810, bus 820, main memory 830, read-only memory 840, mass storage device 850, communication port(s) 860, and processing circuitry 870.

Those skilled in the art will appreciate that the computer system 800 may include more than one processing circuitry 870 and one or more communication ports 860. The processing circuitry 870 should be understood to mean circuitry based on one or more microprocessors, microcontrollers, digital signal processors, programmable logic devices, Field-Programmable Gate Arrays (FPGAs), Application-Specific Integrated Circuits (ASICs), etc., and may include a multi-core processor (e.g., dual-core, quadcore, Hexa-core, or any suitable number of cores) or supercomputer. In some embodiments, the processing circuitry 870 is distributed across multiple separate processors or processing units, for example, multiple of the same type of processing units (e.g., two Intel Core i7 processors) or multiple different processors (e.g., an Intel Core i5 processor and an Intel Core i7 processor). Examples of the processing circuitry 870 include, but are not limited to, an Intel® Itanium® or Itanium 2 processor(s), or AMD® Opteron® or Athlon MP® processor(s), Motorola® lines of processors, System on Chip (SoC) processors or other future processors. The processing circuitry 870 may include various modules associated with embodiments of the present disclosure.

The communication port 860 may include a cable modem, Integrated Services Digital Network (ISDN) modem, a Digital Subscriber Line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of electronic devices or communication of electronic devices in locations remote from each other. The communication port 860 may be any RS-232 port for use with a modem-based dialup connection, a 10/100 Ethernet port, a Gigabit, or a 10 Gigabit port using copper or fiber, a serial port, a parallel port, or other existing or future ports. The communication port 860 may be chosen depending on a network, such as a Local Area Network (LAN), Wide Area Network (WAN), or any network to which the computer system 800 may be connected.

The main memory 830 may include Random Access Memory (RAM) or any other dynamic storage device commonly known in the art. Read-only memory (ROM) 840 may be any static storage device(s), e.g., but not limited to, a Programmable Read-Only Memory (PROM) chips for storing static information, e.g., start-up or BIOS instructions for the processing circuitry 870.

The mass storage device 850 may be an electronic storage device. As referred to herein, the phrase "electronic storage device" or "storage device" should be understood to mean any device for storing electronic data, computer software, or firmware, such as random-access memory, read-only memory, hard drives, optical drives, Digital Video Disc (DVD) recorders, Compact Disc (CD) recorders, BLU-RAY disc (BD) recorders, BLU-RAY 3D disc recorders, Digital Video Recorders (DVRs, sometimes called a personal video recorder or PVRs), solid-state devices, quantum storage devices, gaming consoles, gaming media, or any other suitable fixed or removable storage devices, and/or any combination of the same. Nonvolatile memory may also be used (e.g., to launch a boot-up routine and other instructions). Cloud-based storage may be used to supplement the main memory 830. The mass storage device 850 may be any current or future mass storage solution, which may be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firmware interfaces), e.g., those available from Seagate (e.g., the Seagate Barracuda 7200 family) or Hitachi (e.g., the Hitachi Deskstar 7K1000), one or more optical discs, Redundant Array of Independent Disks (RAID) storage, e.g., an array of disks (e.g., SATA arrays), available from various vendors including Dot Hill Systems Corp., LaCie, Nexsan Technologies, Inc. and Enhance Technology, Inc.

The bus 820 communicatively couples the processing circuitry 870 with the other memory, storage, and communication blocks. The bus 820 may be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects processing circuitry 870 to the software system.

Optionally, operator and administrative interfaces, e.g., a display, keyboard, and a cursor control device, may also be coupled to the bus 820 to support direct operator interaction with the computer system 800. Other operator and administrative interfaces may be provided through network connections connected through the communication port(s) 860. The external storage device 810 may be any kind of external hard drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

The computer system 800 may be accessed through a user interface. The user interface application may be implemented using any suitable architecture. For example, it may be a stand-alone application wholly implemented on the computer system 800. The user interfaces application and/or any instructions for performing any of the embodiments discussed herein may be encoded on computer-readable media. Computer-readable media includes any media capable of storing data. In some embodiments, the user interface application is client-server-based. Data for use by a thick or thin client implemented on electronic device computer system 800 is retrieved on-demand by issuing requests to a server remote to the computer system 800. For example, computer system 800 may receive inputs from the user via an input interface and transmit those inputs to the remote server for processing and generating the corresponding outputs. The generated output is then transmitted to the computer system 800 for presentation to the user.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded to the widest scope consistent with the principles and novel features disclosed herein. It is contemplated that additional embodiments are within the spirit and true scope of the disclosed subject matter.

We claim:

1. A method for providing recommendations in a content rendering environment including at least one presenter and a first plurality of attendees, the method comprising:

receiving, by a processing unit, user data for said content rendering environment with a plurality of users comprising said at least one presenter and said first plurality of attendees, wherein the user data relates to the one or more attendees, wherein the user data comprises sensor data from a plurality of sensors monitoring the first plurality of attendees in real time that is continuously received from respective user devices of respective first plurality of attendees;

based on detecting a trigger condition in the user data, selecting a second plurality of attendees from the first plurality attendees based on the received user data and receiving a plurality of pre-stored user profiles of the second plurality of attendees indicating respective preferences for interaction with the at least one presenter;

analyzing the user data to determine at least one presenter action to be performed by the at least one presenter, wherein the at least one presenter action includes an interaction between the at least one presenter and the second plurality of attendees;

identifying a type of the at least one presenter action to be one of a private action and a public action based on the respective preferences of the second plurality of attendees, wherein the at least one presenter action is the public action when the presenter action is viewable by the first plurality of attendees, and wherein the presenter action is the private action when the presenter action is viewable only by a respective attendee;

generating, by the processing unit, one or more recommendations specific to the preferences of the second plurality of selected attendees to the at least one presenter, based on the user data, the determined presenter action, the identified type of the at least one presenter action, and the plurality of pre-stored user-profiles, wherein the one or more recommendations are used to initiate interaction in the content rendering environment between the at least one presenter and the second plurality of attendees amongst the one or more attendees; and providing, by the processing unit, the one or more recommendations to the at least one presenter during rendering of the content to the one or more attendees, wherein the one or more recommendations allows interaction by the presenter with the respective user devices of the second plurality of attendees together.

2. The method as claimed in claim 1, wherein the user data comprises at least one of:
real-time user actions of the first plurality of attendees during rendering of the content to the one or more attendees; and
pre-stored user profiles of each of the first plurality of attendees.

3. The method as claimed in claim 1, further comprising:
monitoring, by the processing unit, real-time user actions of the first plurality of attendees during rendering of the content to the one or more attendees, wherein the real-time user actions are used as the user data for generating the one or more recommendations.

4. The method as claimed in claim 3, wherein the real-time user actions comprise at least one of eyeball movement, head movement, gesture, keyboard input, screen input, pointing device input, or voice input of the first plurality of attendees.

5. The method as claimed in claim 1, wherein the presenter action comprises communicating, with the second plurality of attendees, at least one of audio data, textual data, supplementary data, graphical data, haptic data, video data and alert data.

6. The method as claimed in claim 1, wherein the one or more recommendations are at least one of visual recommendations, audio recommendations and haptic recommendations.

7. A processing unit for providing recommendations in a content rendering environment including at least one presenter and one or more attendees, the processing unit comprises:
one or more processors; and
a memory communicatively coupled to the one or more processors, wherein the memory stores processor-executable instructions, which, on execution, cause the one or more processors to:
receive user data for said content rendering environment with a plurality of users comprising said at least one presenter and said first plurality of attendees, wherein the user data relates to the one or more attendees, wherein the user data comprises sensor data from a plurality of sensors monitoring the first plurality of attendees in realtime that is continuously received from respective user devices of respective first plurality of attendees;
based on detecting a trigger condition in the user data, select a second plurality of attendees from the first plurality attendees based on the received user data and receive a plurality of pre-stored user profiles of the second plurality of attendees indicating respective preferences for interaction with the at least one presenter;
analyze the user data to determine at least one presenter action to be performed by the at least one presenter, wherein the at least one presenter action includes an interaction between the at least one presenter and the second plurality of attendees;
identify a type of the at least one presenter action to be one of a private action and a public action based on the respective preferences of the second plurality of attendees, wherein the at least one presenter action is the public action when the presenter action is viewable by the first plurality of attendees, and wherein the presenter action is the private action when the presenter action is viewable only by a respective attendee;
generate one or more recommendations specific to the preferences of the second plurality of selected attendees to the at least one presenter, based on the user data, the determined presenter action, the identified type of the at least one presenter action, and the plurality of pre-stored user-profiles, wherein the one or more recommendations are used to initiate interaction in the content rendering environment between the at least one presenter and the second plurality of attendees amongst the one or more attendees; and
provide the one or more recommendations to the at least one presenter during rendering of the content to the one or more attendees, wherein the one or more recommendations allows interaction by the presenter with the respective user devices of the second plurality of attendees together.

8. The processing unit as claimed in claim 7, wherein the user data comprises at least one of:
real-time user actions of the first plurality of during rendering of the content to the one or more attendees; and
pre-stored user profiles of each of the first plurality of attendees.

9. The processing unit as claimed in claim 7, wherein the processor is further configured to:
monitor real-time user actions of the first plurality of attendees during rendering of the content to the one or more attendees, wherein the real-time user actions are used as the user data for generating the one or more recommendations.

10. The processing unit as claimed in claim 9, wherein the real-time user actions comprise at least one of eyeball movement, head movement, gesture, keyboard input, screen input, pointing device input, or voice input of the one or more first plurality of attendees.

11. The processing unit as claimed in claim 7, wherein the presenter action comprises communicating, with the second plurality of attendees, at least one of audio data, textual data, supplementary data, graphical data, haptic data, video data and alert data.

12. The processing unit as claimed in claim 7, wherein the one or more recommendations are at least one of visual recommendations, audio recommendations and haptic recommendations.

13. A non-transitory computer-readable medium including instructions stored thereon that when processed by one or more processors cause a system to perform operations comprising:
receiving user data for said content rendering environment with a plurality of users comprising said at least one presenter and said first plurality of attendees, wherein the user data relates to the one or more attendees, wherein the user data comprises sensor data from a plurality of sensors monitoring the first plurality of attendees in real time that is continuously received from respective user devices of respective first plurality of attendees;

based on detecting a trigger condition in the user data, selecting a second plurality of attendees from the first plurality attendees based on the received user data and receive a plurality of pre-stored user profiles of the second plurality of attendees indicating respective preferences for interaction with the at least one presenter;

analyzing the user data to determine at least one presenter action to be performed by the at least one presenter, wherein the at least one presenter action includes an interaction between the at least one presenter and the second plurality of selected attendees;

identifying a type of the at least one presenter action to be one of a private action and a public action based on the respective preferences of the second plurality of attendees, wherein the at least one presenter action is the public action when the presenter action is viewable by the first plurality of attendees, and wherein the presenter action is the private action when the presenter action is viewable only by a respective attendee;

generating one or more recommendations specific to the preferences of the second plurality of selected attendees to the at least one presenter, based on the user data, the determined presenter action, the identified type of the at least one presenter action, and the plurality of pre-stored user-profiles, wherein the one or more recommendations are used to initiate interaction in the content rendering environment between the at least one presenter and the second plurality of attendees amongst the one or more attendees; and providing the one or more recommendations to the at least one presenter during rendering of the content to the one or more attendees, wherein the one or more recommendations allows interaction by the presenter with the respective user devices of the second plurality of attendees together.

14. The medium as claimed in claim 13, wherein the user data comprises at least one of:
real-time user actions of the first plurality of during rendering of the content to the one or more attendees; and
pre-stored user profiles of each of the first plurality of attendees.

15. The medium as claimed in claim 13, further comprising:
monitoring real-time user actions of the first plurality of attendees during rendering of the content to the one or more attendees, wherein the real-time user actions are used as the user data for generating the one or more recommendations, wherein the real-time user actions comprise at least one of eyeball movement, head movement, gesture, keyboard input, screen input, pointing device input, or voice input of the one or more attendees.

16. The medium as claimed in claim 13,
wherein the presenter action comprises communicating, with the second plurality of attendees, at least one of audio data, textual data, supplementary data, graphical data, haptic data, video data and alert data;
wherein the one or more recommendations are at least one of visual recommendations, audio recommendations and haptic recommendations.

* * * * *